(12) United States Patent
Sabatino

(10) Patent No.: US 6,970,079 B2
(45) Date of Patent: Nov. 29, 2005

(54) HIGH/LOW LEVEL ALARM CONTROLLER

(75) Inventor: Daniel Sabatino, 3 Carriage Dr., Burlington, CT (US) 06013

(73) Assignee: Daniel Sabatino, Burlington, CT (US)

( * ) Notice: Subject to any disclaimer, the term of this patent is extended or adjusted under 35 U.S.C. 154(b) by 0 days.

(21) Appl. No.: 10/846,523

(22) Filed: May 17, 2004

(65) Prior Publication Data

US 2004/0227635 A1    Nov. 18, 2004

Related U.S. Application Data

(60) Provisional application No. 60/470,333, filed on May 15, 2003.

(51) Int. Cl.[7] ........................ G08B 29/00; G01F 23/30
(52) U.S. Cl. ..................... 340/511; 340/984; 340/450; 340/618; 73/307; 137/551; 116/109; 307/118
(58) Field of Search ...................... 340/511, 984, 985, 340/525, 450, 461, 612, 618, 623; 73/290 R, 73/307; 116/109; 137/386, 392, 551; 307/116, 307/118

(56) References Cited

U.S. PATENT DOCUMENTS

| | | | | |
|---|---|---|---|---|
| 2,756,410 | A | * | 7/1956 | Tobias .................. 340/870.09 |
| 3,185,789 | A | | 5/1965 | Gunther |
| 3,939,471 | A | | 2/1976 | Momberg |
| 3,978,299 | A | | 8/1976 | Takai |
| 3,980,847 | A | | 9/1976 | Mines et al. |
| 3,984,877 | A | | 10/1976 | Kirby |
| 4,020,488 | A | * | 4/1977 | Martin et al. ............... 340/508 |
| 4,037,193 | A | | 7/1977 | Uemura |
| 4,090,050 | A | | 5/1978 | Siiberg |
| 4,199,983 | A | | 4/1980 | Kobayashi et al. |
| 4,341,178 | A | * | 7/1982 | Price ...................... 114/183 R |
| 4,589,282 | A | | 5/1986 | Dumery |
| 4,627,283 | A | | 12/1986 | Nishida et al. |
| 4,637,254 | A | | 1/1987 | Dyben et al. |
| 4,736,077 | A | | 4/1988 | Valente |
| 4,899,706 | A | | 2/1990 | Sasaki |
| 4,908,783 | A | | 3/1990 | Maier |
| 4,962,371 | A | * | 10/1990 | Repp et al. .................. 340/626 |
| 4,967,181 | A | | 10/1990 | Iizuka et al. |
| 5,006,834 | A | | 4/1991 | Fountain |
| 5,023,608 | A | | 6/1991 | Delisle, Jr. et al. |
| 5,070,806 | A | | 12/1991 | Coster |
| 5,105,663 | A | | 4/1992 | Kuhlen |
| 5,124,686 | A | | 6/1992 | White et al. |
| 5,181,022 | A | | 1/1993 | Schupp |
| 5,225,813 | A | | 7/1993 | Raub, Sr. |
| 5,229,766 | A | | 7/1993 | Hargest |
| 5,283,552 | A | | 2/1994 | Sol |
| 5,369,396 | A | | 11/1994 | Kurata et al. |

(Continued)

OTHER PUBLICATIONS

Tankwatch 4 Level Monitor System, Owner's Manual; Installation Instructions, p. 4, Dometic Corporation* SeaLand, May 2004.

*Primary Examiner*—Donnie L. Crosland
(74) *Attorney, Agent, or Firm*—Connolly Bove Lodge & Hutz LLP

(57) ABSTRACT

A high/low level alarm controller having ability to interface with level sensing equipment and instrumentation in a manner that isolates the controller from downstream components is presented. The controller accepts power, logic and transduced level inputs; output from the controller is available to drive relays, solenoid valves, motors, pumps, alarm horns, etc. The high/low level alarm controller is ideal for existing/retrofit applications and new installations alike.

11 Claims, 8 Drawing Sheets

U.S. PATENT DOCUMENTS

| | | |
|---|---|---|
| 5,483,227 A | 1/1996 | Kuo et al. |
| 5,506,564 A | 4/1996 | Hargest |
| 5,515,891 A | 5/1996 | Langlois |
| 5,532,673 A | 7/1996 | Olson et al. |
| 5,552,774 A | 9/1996 | Gridley |
| 5,565,687 A | 10/1996 | Berrill |
| 5,576,582 A | 11/1996 | White |
| 5,610,591 A | 3/1997 | Gallagher |
| 5,627,523 A | 5/1997 | Besprozvanny et al. |
| 5,831,536 A | 11/1998 | Zager |
| 5,832,968 A | 11/1998 | Leary |
| 6,415,209 B1 | 7/2002 | Reimer |
| 6,473,004 B1 | 10/2002 | Small |
| 2001/0045892 A1 | 11/2001 | Thomas et al. |

\* cited by examiner

HIGH/LOW LEVEL ALARM CONTROLLER

This application claims benefit under 35 USC 119(e) of U.S. Provisional Application No. 60/470,333, filed May 15, 2003.

FIELD OF THE INVENTION

The present invention relates generally to fluid level monitoring and, more particularly, to alarm indication and control of specified fluid level using a control system having adjustable set points.

BACKGROUND OF THE INVENTION

Indication of fluid or liquid level is a critical variable in process control, storage tank monitoring, and mechanical systems where liquids are contained. Level monitoring systems for liquids typically comprise a transducer to convert liquid level to an appropriate level indicating variable or signal, a transmission medium for conveying the variable or signal, a receiver to accept and process the variable or signal, and a display for visual indication. Liquid level indication is of particular importance in the marine industry. For example, when boats travel in the open sea, an accurate indication of fuel quantity is an essential component to successful navigation.

In addition to accurate indication of fuel quantity, it is also valuable to have an alarm mechanism that warns of dangerously low or high fluid levels. In the marine industry, warning of low fuel level is important so that marine craft operating personnel can timely plan a fueling station visit. Because fuel dispensing units at most marine fueling stations lack the same automatic shutoff capability that automobile fuel dispensers possess, the risk of fuel spillage from tank overfill is quite high. Fuel spillage contaminates the water and surrounding environment and presents a fire safety danger. Thus, alarm warning of high fuel level is important so that fuel pumping can be stopped to avoid fuel tank overfill.

Fuel level alarm systems are available but a common problem with traditional marine fluid level alarm systems is that source power is switch controlled by the ignition key. Other traditional alarm systems obtain power directly from ship instrumentation. These systems typically employ a timing circuit to shut off power after a predetermined time in order to prevent battery drain. By energizing the alarm system through the instrumentation, however, all on-board instrumentation will be energized since instrumentation is typically daisy-chain wired. Because marine craft fueling typically occurs while at dock, maintenance personnel are at often at work on the marine craft systems while fueling occurs. With traditional alarm systems that energized instrumentation, such maintenance personnel are at risk to electrical shock since components may be unexpectedly energized.

Accordingly, what is needed is an alarm system that properly alarms for low-level but can also be safely used for high-level monitoring and control.

SUMMARY OF THE INVENTION

Aspects of the present invention include a high/low level alarm controller, comprising a selector switch; a relay; and an alarm control circuit, said alarm control circuit being adapted to provide electrical output responsive to level, wherein said selector switch and said relay form an isolation control unit.

Another aspect of the present invention includes a marine craft, comprising a power supply; a gauge coupled to said power supply; and an isolation control unit.

DETAILED DESCRIPTION

Disclosed is a high/low level alarm controller having ability to interface with level sensing equipment and instrumentation in a manner that isolates the controller from downstream components. The controller accepts power, logic and transduced level inputs; output from the controller is available to drive relays, solenoid valves, motors, pumps, alarm horns, etc.

Figure 1:
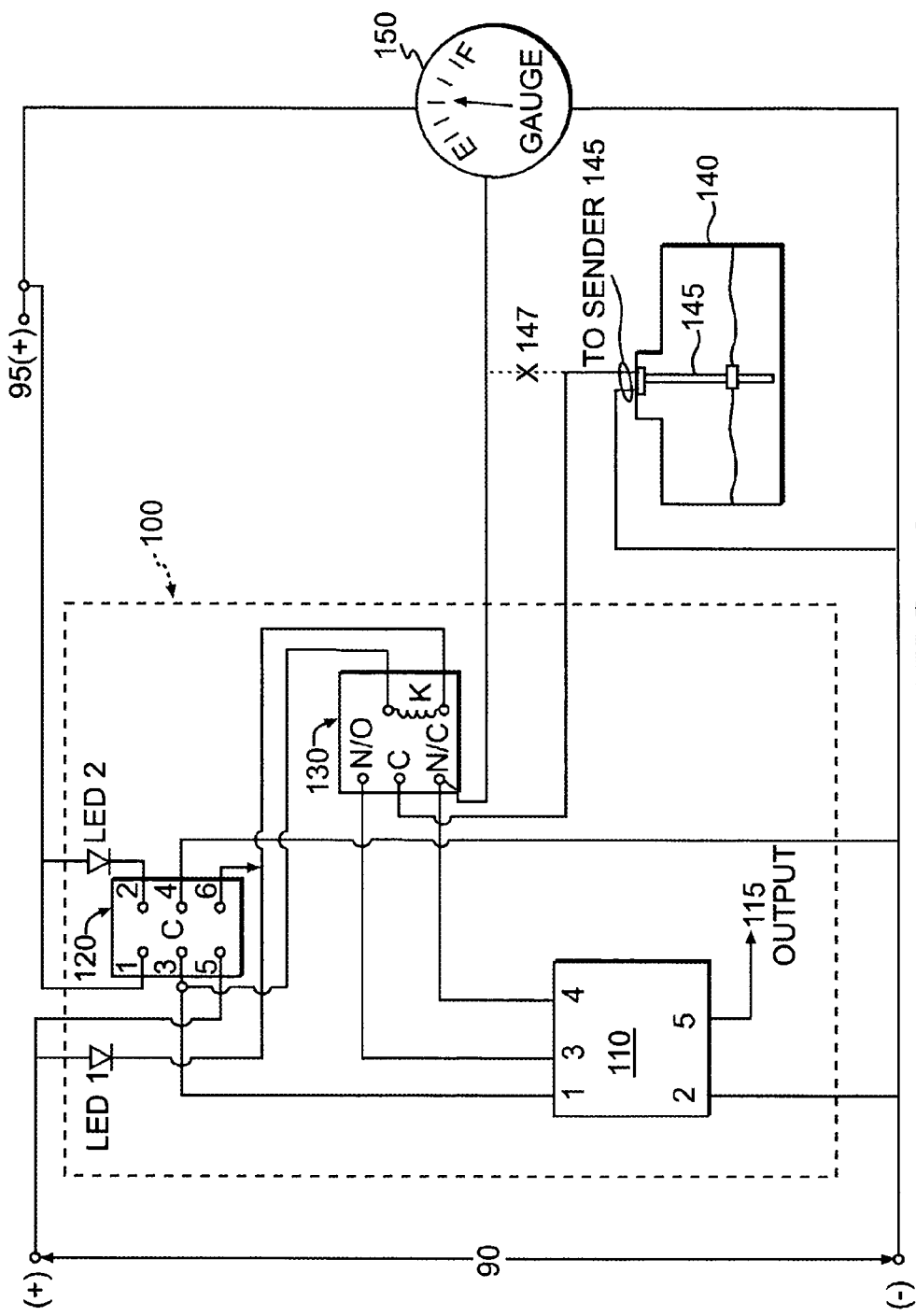
FIG. 1 illustrates a wiring diagram of an embodiment of a high/low level alarm controller.

FIG. 1 illustrates a wiring diagram of the high/low level alarm controller 100 configured in accordance with an embodiment of the present invention. Controller 100 provides three modes of operation: high-level monitoring mode, low-level monitoring mode, and disengaged, i.e., off. The embodiment illustrated in FIG. 1 discloses isolation of level sending unit 145 from level gauge 150 when controller 100 is in the high-level monitoring mode. Level gauge 150 can be analog or digital. Level sending unit 145 is installed within tank 140. In the high-level monitoring mode, sending unit 145 is powered by alarm control circuit 110, which obtains power independent of system instrumentation, such as gauge 150. Alarm control circuit 110 provides an intrinsically safe voltage to sending unit 145. With respect to voltage, an intrinsically safe voltage supply is characterized as a voltage source having high internal resistance with low output current, which is held constant. So configured, the power output of the source is held low such that when the supply terminal is grounded, output voltage falls to ground potential and no spark occurs. Thus, at light or no load (i.e., short circuit) conditions, the intrinsically safe voltage supply provides its lowest level of voltage. As load increases, the supply voltage increases proportionally and at the limit (i.e., open circuit condition) the supply voltage is at its maximum design level. Sending unit 145 is described in copending application Ser. No. 10/791,286, which was filed Mar. 3, 2004 by the inventor of the instant application and is incorporated by reference herein in its entirety.

Operating modes for controller 100 are established via selector switch 120. FIG. 1 illustrates selector switch 120 as a double-pole double-throw (DPDT) center off switch (i.e., a three position switch), but selector switch 120 can be of any multi-pole switch configuration to effectuate mode selection of controller 100. Operating modes could also be selected by using a plurality of single-pole switches. Selector switch 120 is illustrated in FIG. 1 as having six terminals for external connection. High-level monitoring mode is selected by toggling selector switch 120 such that terminal 3 is connected to terminal 5 and terminal 4 is connected to terminal 6. Low-level monitoring mode is selected by toggling selector switch 120 such that terminal 3 is connected to terminal 1 and terminal 4 is connected to terminal 2. The 'off' mode is selected by placing selector switch 120 in the center position.

Intermediate control of controller 100 is facilitated by relay 130. FIG. 1 illustrates relay 130 as a two contact (normally-open and normally-closed) relay with a common. Intermediate control of controller 100 can, however, be effectuated with a plurality of single contact relays or multiple contact relays. Further, FIG. 1 illustrates relay 130 as an electromechanical relay but relay 130 can also be a solid-state relay or the intermediate control can also be effectuated through use a transistor circuit configured to perform the function of relay 130. Selector switch 120 and relay 130 form an isolation control unit.

Alarm circuit 110 provides control logic to drive output 115 of controller 100. Alarm circuit 110 is illustrated in FIG. 1 as having five terminal connections. A detailed description of alarm circuit 110 is provided below.

High/low level alarm controller 100 utilizes two power connections: one power connection that couples to a steady source 90 and another power connection that couples to a switched or keyed source 95, such as might be available from an ignition key. Power source 90 connects to terminal 5 of selector switch 120 and the anode terminal of light emitting diode 1 (LED1). Power source 95 connects to terminal 1 of selector switch 120 and the anode terminal of light emitting diode 2 (LED2). The cathode of LED1 is connected to terminal 6 of selector switch 120 and a first end of coil K within relay 130. The cathode terminal of LED2 connects to terminal 2 of selector switch 120. Terminal 4 of selector switch 120 is connected to system ground; and terminal 3 of selector switch 120 is connected to a second end of coil K within relay 130, and terminal 1 of alarm circuit 110.

Relay 130 has at least one normally-open contact N/O that is connected to terminal 3 of alarm circuit 110, and at least one normally-closed contact N/C that is connected to terminal 4 of alarm circuit 110. Normally-closed contact N/C also connects to level gauge 150. The common terminal C of relay 130 connects to sending unit 145.

Terminal 2 of alarm circuit 110 is connected to system ground and terminal 5 of alarm circuit 110 provides output 115 of controller 100.

In existing installations, sending unit 145 would likely be connected to level gauge 150. To achieve isolation, this connection must be severed 147 and sending unit 145 and level gauge 150 each connected to controller 100 as described above.

To activate high-level monitoring mode, a user will toggle selector switch 120 to a first position such that terminal 3 is connected to terminal 5 and terminal 4 is connected to terminal 6. This configuration will provide a ground connection to LED 1, causing it to illuminate, and a ground connection first end of coil K. The configuration also provides input voltage 90 to alarm circuit 110 and input voltage 90 to a second end of coil K. Coil K is thus energized and normally-open contact N/O closes, thereby connecting sending unit 145 to alarm circuit 110, and normally-closed contact N/C opens, thereby isolating sending unit 145 from level gauge 150, which is connected to terminal 4 of alarm circuit 110. Alarm circuit 110 provides an intrinsically safe voltage to sending unit 145 via terminal 3.

Alarm circuit 110 is thus armed for high-level mode monitoring. Alarm circuit 110 will remain armed until sending unit 145 provides a signal (or resistance) corresponding the high-level set point established by the logic of alarm circuit 110, discussed below. When sending unit 145 provides a signal corresponding the high-level set point, output 115 of alarm circuit 110 will energize, thereby enabling power to be supplied to relays, solenoid valves, motors, pumps, alarm horns, etc. In another embodiment, two high-level set points are made, thus enabling a preliminary output 115 to be provided at a first high-level (high) and a second output 115 to be provided at a second high-level (high-high). Such a configuration could provide warning that a critical high level, established by the second set point, is approaching. Output 115 can be disengaged by toggling selector switch 120 to a center-off position, thereby removing power from alarm circuit 110.

To activate low-level monitoring mode, a user will toggle selector switch 120 such that terminal 3 is connected to terminal 1 and terminal 4 is connected to terminal 2. This configuration will provide a ground connection to LED2, causing it to illuminate when power source 95 is available, and remove a ground connection a first end of coil K, causing it to de-energize. Because coil K is de-energized, the normally-open contact N/O of relay 130 is open, and the normally-closed contact N/C of relay 130 is closed, thus connecting sending unit 145 to level gauge 150, which provides intrinsically safe voltage to the sending unit. The configuration also provides input voltage 95 to alarm circuit 110.

Alarm circuit 110 is thus armed for low-level mode monitoring. Alarm circuit 110 will remain armed until sending unit 145 provides a signal (or resistance) corresponding the low-level set point established by the logic of alarm circuit 110, discussed below. When sending unit 145 provides a signal corresponding the low-level set point, output 115 of alarm circuit 110 will energize, thereby enabling power to be supplied to relays, solenoid valves, motors, pumps, alarm horns, etc. In another embodiment, two low-level set points are established, thus enabling a preliminary output 115 to be provided at a first low-level (low) and a second output 115 to be provided at a second high-level (low-low). Such a configuration could provide warning that a critical low level, established by the second set point, is approaching. Output 115 can be disengaged by toggling selector switch 120 to a center-off position, thereby removing power from alarm circuit 110.

To maintain controller 100 in a disengaged mode, selector switch 120 should be toggled in its center-off position, thereby decoupling ground and power connections to alarm circuit 110. The high/low level alarm controller 100 is ideal for installation in marine craft requiring monitoring of fuel and fluid levels.

Figure 2:
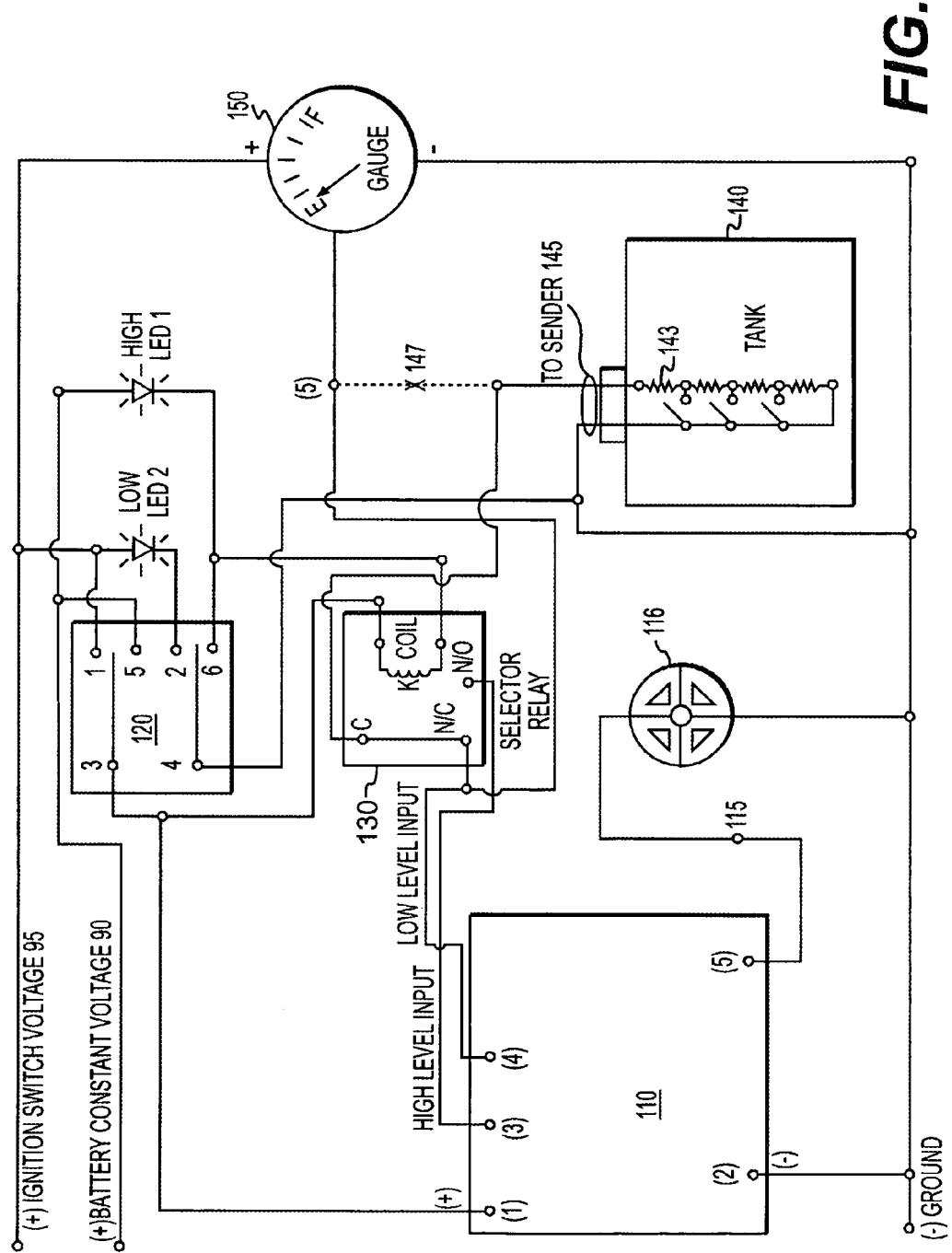
FIG. 2 illustrates a schematic diagram of the wiring diagram illustrated in FIG. 1.

FIG. 2 illustrates a schematic diagram of an application of the wiring diagram illustrated in FIG. 1. In this embodiment, alarm horn 116 is connected to output 115 of alarm circuit 110, selector switch 120 is shown in the center-off position, and relay 130 is show in a de-energized state.

Figure 3:
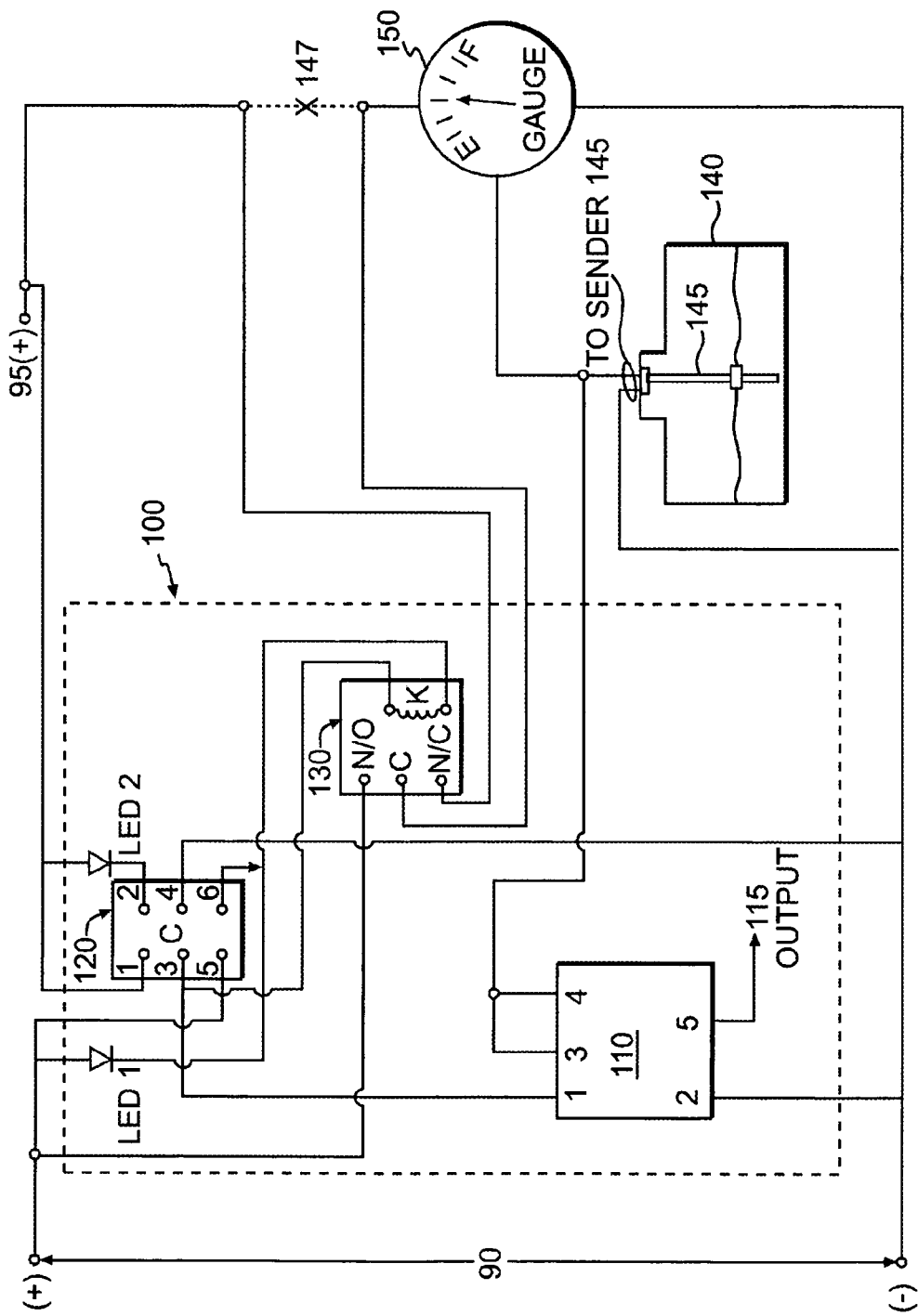
FIG. 3 illustrates a wiring diagram of another embodiment of a high/low level alarm controller.

FIG. 3 illustrates a wiring diagram of the high/low level alarm controller 100 configured in accordance with another embodiment of the present invention. Controller 100 provides three modes of operation: high-level monitoring mode, low-level monitoring mode, and disengaged, i.e., off. The embodiment illustrated in FIG. 3 discloses isolation of level sending unit 145 and level gauge 150 when controller 100 is in the high-level monitoring mode. Isolation of sending unit 145 and level gauge 150 removes them from daisy-chain wiring harness of typical installations, thereby preventing unwanted voltage from powering-up external instruments and sensors while controller 100 is monitoring high-level.

Operating modes for controller 100 are established via selector switch 120. FIG. 3 illustrates selector switch 120 as a double-pole double-throw (DPDT) center off switch (i.e., a three position switch), but selector switch 120 can be of any multi-pole switch configuration to effectuate mode selection of controller 100. Operating modes could also be selected by using a plurality of single-pole switches. Selector switch 120 is illustrated in FIG. 3 as having six terminals for external connection. High-level monitoring mode is selected by toggling selector switch 120 such that terminal 3 is connected to terminal 5 and terminal 4 is connected to terminal 6. Low-level monitoring mode is selected by toggling selector switch 120 such that terminal 3 is connected to terminal 1 and terminal 4 is connected to terminal 2. The 'off' mode is selected by placing selector switch 120 in the center position.

Intermediate control of controller 100 is facilitated by relay 130. FIG. 3 illustrates relay 130 as a two contact (normally-open and normally-closed) relay with a common. Intermediate control of controller 100 can, however, be achieved with a plurality of single contact relays or multiple contact relays. Further, FIG. 3 illustrates relay 130 as an electromechanical relay but relay 130 can also be a solid-state relay or the intermediate control can also be effectuated through use a transistor circuit configured to perform the function of relay 130.

Alarm circuit 110 provides control logic to drive output 115 of controller 100. Alarm circuit 110 is illustrated in FIG. 3 as having five terminal connections. A detailed description of alarm circuit 110 is provided below.

High/low level alarm controller 100 utilizes two power connections: one power connection that couples to a steady source 90 and another power connection that couples to a switched or keyed source 95, such as might be available from an ignition key. Power source 90 connects to terminal 5 of selector switch 120 and the anode terminal of light emitting diode 1 (LED1). Power source 95 connects to terminal 1 of selector switch 120 and the anode terminal of light emitting diode 2 (LED2). The cathode of LED1 is connected to terminal 6 of selector switch 120 and a first end of coil K within relay 130. The cathode terminal of LED2 connects to terminal 2 of selector switch 120. Terminal 4 of selector switch 120 is connected to system ground; and terminal 3 of selector switch 120 is connected to a second end of coil K within relay 130, and terminal 1 of alarm circuit 110.

Relay 130 has at least one normally-open contact N/O that is connected to power source 90, and at least one normally-closed contact N/C that is connected to power source 95. The common terminal C of relay 130 connects to level gauge 150.

Terminals 3 and 4 of alarm circuit 110 connect together and are connected to sender unit 145 and gauge 150. Terminal 2 of alarm circuit 110 is connected to system ground and terminal 5 of alarm circuit 110 provides output 115 of controller 100.

To activate high-level monitoring mode, a user will toggle selector switch 120 to a first position such that terminal 3 is connected to terminal 5 and terminal 4 is connected to terminal 6. This configuration will provide a ground connection to LED1, causing it to illuminate, and a ground connection first end of coil K of relay 130. The configuration also provides input voltage 90 to alarm circuit 110 at terminal 1 and input voltage 90 to a second end of coil K. Coil K is thus energized and normally-open contact N/O closes, thereby connecting gauge 150 to power source 90, and normally-closed contact N/C opens, thereby disconnecting gauge 150 from power source 95, thus isolating level gauge 150 along with sending unit 145, which is connected to terminals 3 and 4 of alarm circuit 110. Gauge 150 provides an intrinsically safe voltage to sending unit 145 and alarm circuit 110.

Alarm circuit 110 is thus armed for high-level mode monitoring. Alarm circuit 110 will remain armed until sending unit 145 provides a signal (or resistance) corresponding the high-level set point established by the logic of alarm circuit 110, discussed below. When sending unit 145 provides a signal corresponding the high-level set point, output 115 of alarm circuit 110 will energize, thereby enabling power to be supplied to relays, solenoid valves, motors, pumps, alarm horns, etc. In another embodiment, two high-level set points are made, thus enabling a preliminary output 115 to be provided at a first high-level (high) and a second output 115 to be provided at a second high-level (high-high). Such a configuration could provide warning that a critical high level, established by the second set point, is approaching. Output 115 can be disengaged by toggling selector switch 120 to a center-off position, thereby removing power from alarm circuit 110.

To activate low-level monitoring mode, a user will toggle selector switch 120 such that terminal 3 is connected to terminal 1 and terminal 4 is connected to terminal 2. This configuration will provide a ground connection to LED2, causing it to illuminate when power source 95 is available, and remove a ground connection a first end of coil K, causing it to de-energize. Because coil K is de-energized, the normally-open contact N/O of relay 130 is open, and the normally-closed contact N/C of relay 130 is closed, thus connecting gauge 150 to power source 95.

Alarm circuit 110 is thus armed for low-level mode monitoring. Alarm circuit 110 will remain armed until sending unit 145 provides a signal (or resistance) corresponding the low-level set point established by the logic of alarm circuit 110, discussed below. When sending unit 145 provides a signal corresponding the low-level set point, output 115 of alarm circuit 110 will energize, thereby enabling power to be supplied to relays, solenoid valves, motors, pumps, alarm horns, etc. In another embodiment, two low-level set points are established, thus enabling a preliminary output 115 to be provided at a first low-level (low) and a second output 115 to be provided at a second high-level (low-low). Such a configuration could provide warning that a critical low level, established by the second set point, is approaching. Output 115 can be disengaged by toggling selector switch 120 to a center-off position, thereby removing power from alarm circuit 110.

To maintain controller 100 in a disengaged mode, selector switch 120 should be toggled in its center-off position, thereby decoupling ground and power connections to alarm circuit 110.

Figure 4:
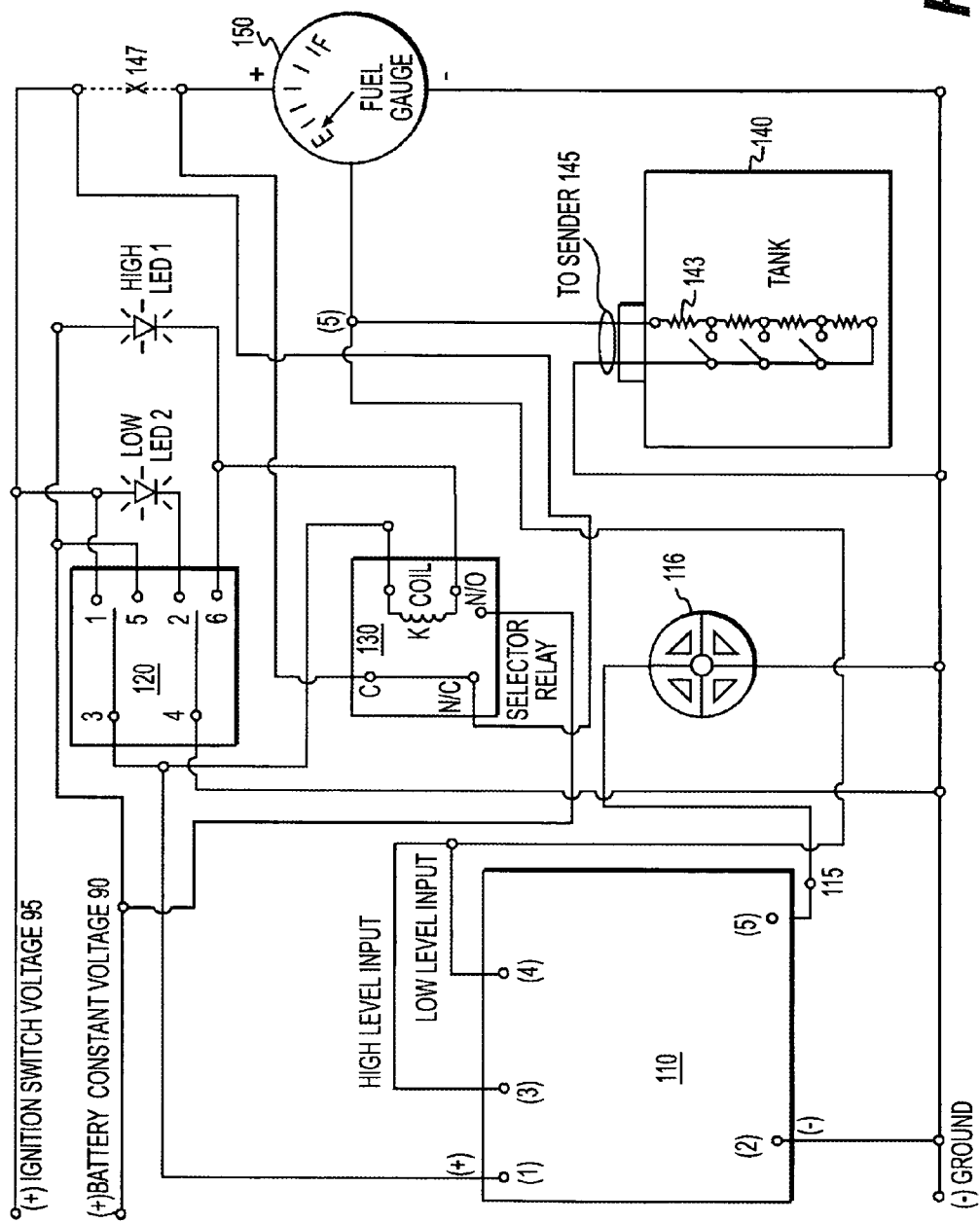
FIG. 4 illustrates a schematic diagram of the wiring diagram illustrated in FIG. 3.

FIG. 4 illustrates a schematic diagram of an application of the wiring diagram illustrated in FIG. 2. In this embodiment, alarm horn 116 is connected to output 115 of alarm circuit 110, selector switch 120 is shown in the center-off position, and relay 130 is show in a de-energized state.

Figure 5:
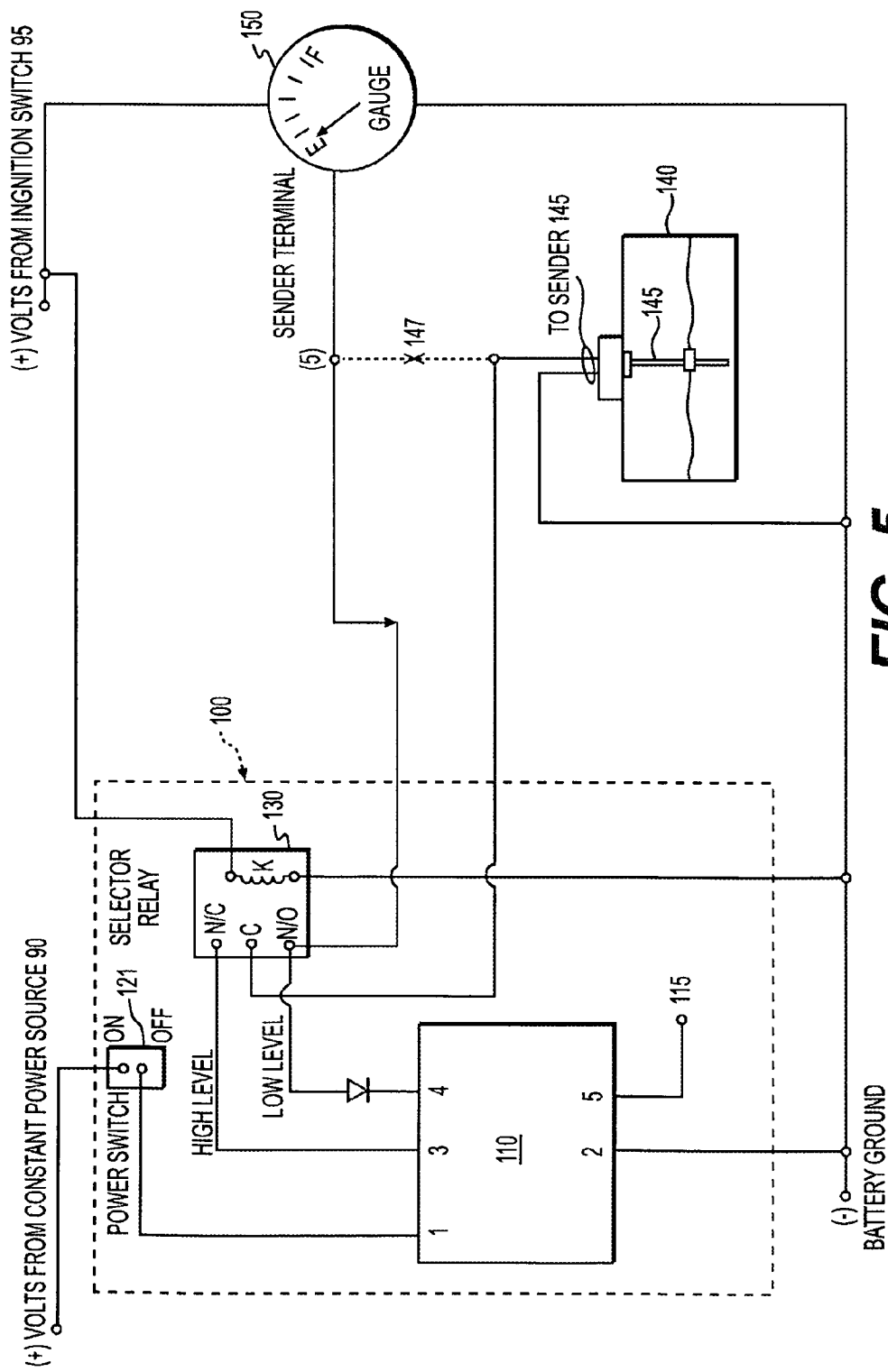
FIG. 5 illustrates a wiring diagram of another embodiment of a high/low level alarm controller.

FIG. 5 a wiring diagram of the high/low level alarm controller 100 configured in accordance with another embodiment of the present invention. The embodiment illustrated in FIG. 5 is similar to that illustrated in FIG. 1 except that selector switch 120 has been replaced by power switch 121, and the high/low level alarm controller 100 is configured to operate automatically based on the position of power switch 121 and power source 95. The embodiment illustrated in FIG. 5 discloses isolation of level sending unit 145 from level gauge 150 when controller 100 is in the high-level monitoring mode. Level sending unit 145 is installed within tank 140. In the high-level monitoring mode, sending unit 145 is powered by alarm control circuit 110, which obtains power independent of system instrumentation, such as gauge 150. Alarm control circuit 110 provides an intrinsically safe voltage to sending unit 145.

Power switch 121 connects alarm control circuit 110 to power source 90. By toggling power switch 121 to the 'on' position, alarm control circuit 110 will be energized and capable of performing level monitoring functions. Low-level monitoring mode occurs when power source 95 is available, which energizes coil K of relay 130, and power switch 121 is toggled to the 'on' position, which arms alarm control circuit 110. When relay 130 is energized, normally-open contact N/O connects sending unit 145 to gauge 150, which provides intrinsically safe voltage to sending unit 145. Alarm control circuit 110 will remain armed until sending unit 145 provides a signal (or resistance) corresponding the low-level set point established by the logic of alarm control circuit 110, discussed below. When sending unit 145 provides a signal corresponding the low-level set point, output 115 of alarm control circuit 110 will energize, thereby enabling power to be supplied to relays, solenoid valves, motors, pumps, alarm horns, etc. In another embodiment, two low-level set points are established, thus enabling a preliminary output 115 to be provided at a first low-level (low) and a second output 115 to be provided at a second high-level (low-low). Such a configuration could provide warning that a critical low level, established by the second set point, is approaching. Output 115 can be disengaged by toggling power switch 121 to the 'off', thereby removing power from alarm control circuit 110.

High-level monitoring occurs when power source 95 is removed, i.e., switched 'off,' and power switch 121 is toggled to the 'on' position, which arms alarm control circuit 110. Because power source 95 is removed, relay 130 is de-energized and sender unit 145 connects to alarm control circuit 110 via the normally-closed contact N/C of relay 130. Sender unit 145 is thus isolated from gauge 150. Alarm control circuit 110 provides an intrinsically safe voltage to sending unit 145. Alarm control circuit 110 will remain armed until sending unit 145 provides a signal (or resistance) corresponding the high-level set point established by the logic of alarm control circuit 110, discussed below. When sending unit 145 provides a signal corresponding the high-level set point, output 115 of alarm control circuit 110 will energize, thereby enabling power to be supplied to relays, solenoid valves, motors, pumps, alarm horns, etc. In another embodiment, two high-level set points are made, thus enabling a preliminary output 115 to be provided at a first high-level (high) and a second output 115 to be provided at a second high-level (high-high). Such a configuration could provide warning that a critical high level, established by the second set point, is approaching. Output 115 can be disengaged by toggling power switch 121 to the 'off' position, thereby removing power from alarm control circuit 110.

To maintain controller 100 in a disengaged mode, power switch 121 should be toggled in its 'off' position, thereby decoupling power connections to alarm control circuit 110.

Figure 6:
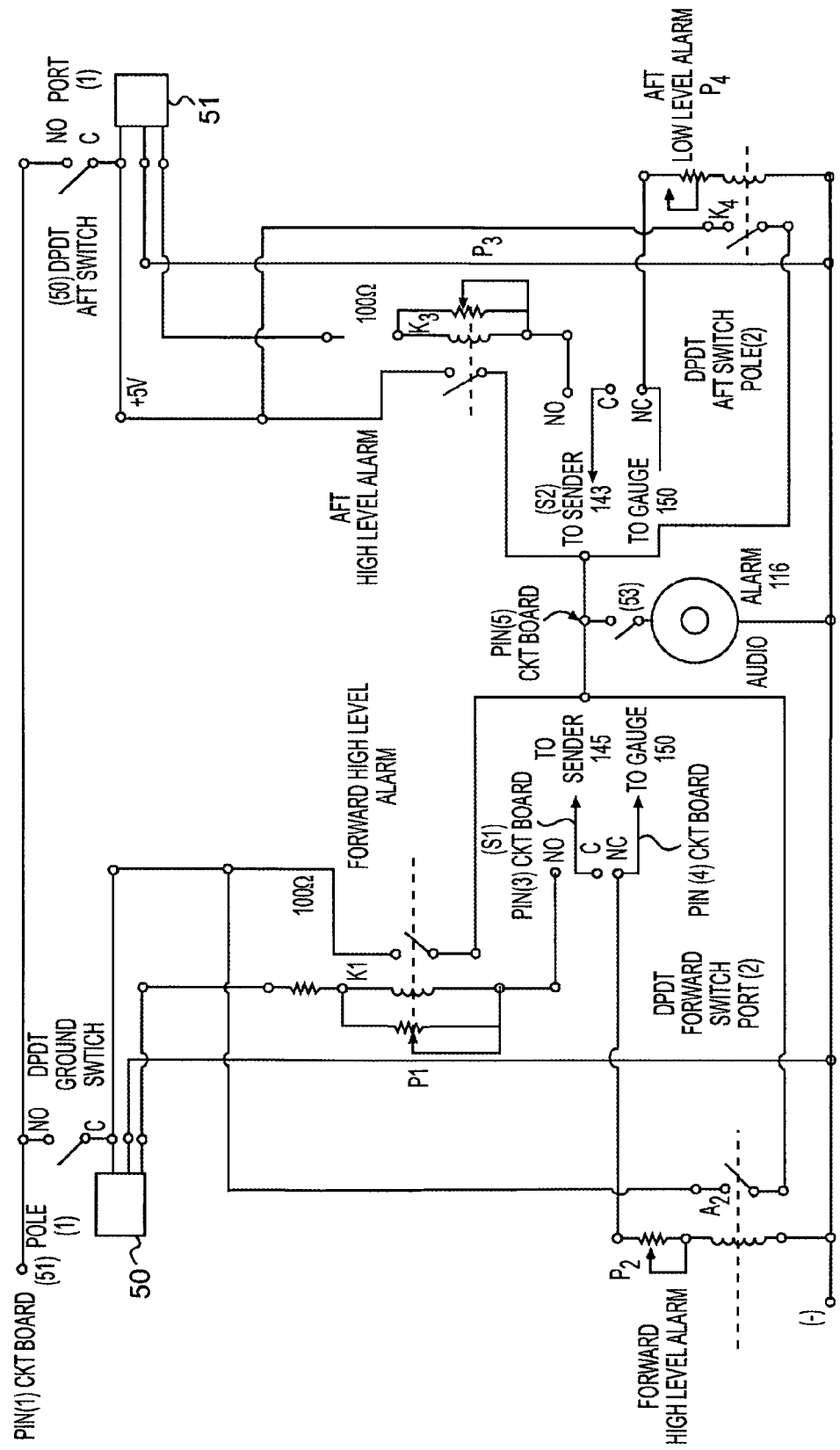
FIG. 6 illustrates a schematic diagram of alarm control circuit 110 in accordance with an embodiment of the present invention.

FIG. 6 illustrates a schematic diagram of alarm control circuit 110 in accordance with an embodiment of the present invention. FIG. 6 provides for high/low level control of two tanks (forward and aft) employing similar level monitoring circuitry. Input power is provided to terminals 1 and 2 of alarm control circuit 110. Input power to alarm control circuit 110 can be via a bridge rectifier to safeguard against changes in polarity. When pole 1 of S1 is closed, voltage is supplied to voltage regulator 50, which in turn provides a regulated voltage supply. High-level monitoring mode is available when pole 2 of S1 is toggled such that the sender unit 145 (not shown) is connected to the coil of relay K1. Potentiometer P1, which adjusts the high-level set point, is connected in parallel to the coil of relay K1. As the voltage at sending unit 145 decreases (voltage decreases as tank level fills), more current will be drawn through the coil of relay K1. When the voltage reaches the high set-point, the current will be such that relay K1 will energize and drive output voltage to terminal 5. FIG. 6 illustrates alarm 116 being connected to terminal 5. To disengage alarm 116, S3 can be toggled to the open position.

In low-level monitoring mode, pole 2 of S1 is toggled to connect gauge 150 and sending unit 145 to potentiometer P2. As level in tank 140 (not shown) decreases, the voltage available at P2 will increase, thereby causing more current to flow through the coil of relay K2. When the level drops down to the low-level set point (set by adjusting P2), relay K2 will energize and drive output voltage to terminal 5, which sounds alarm 116. To disengage alarm 116, S3 can be toggled to the open position.

Description for the Aft tank components is the same as that of the Forward tank just described.

Figure 7:
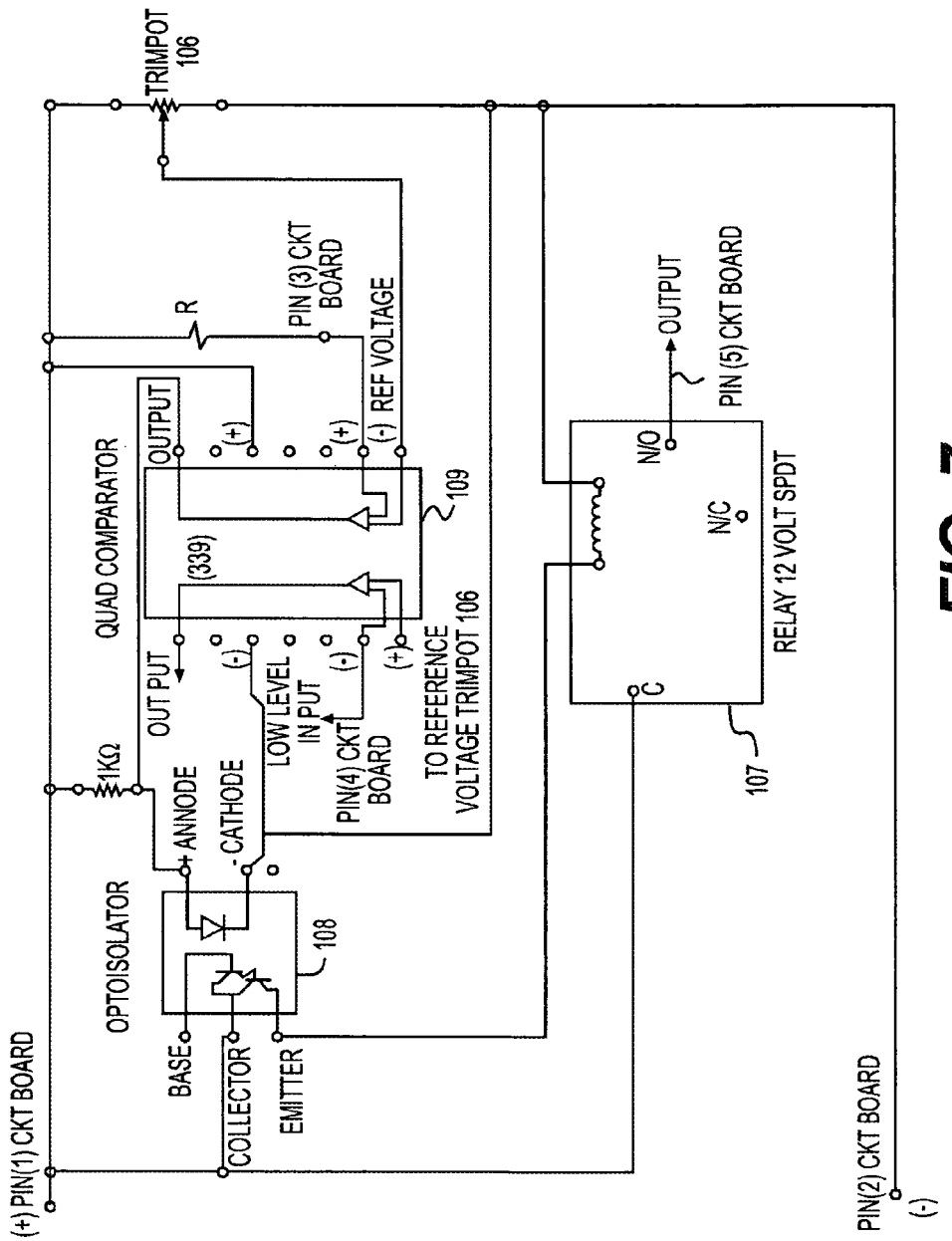
FIG. 7 illustrates a schematic diagram of alarm control circuit 110 in accordance with an embodiment of the present invention.

FIG. 7 illustrates a schematic diagram of alarm control circuit 110 in accordance with an embodiment of the present invention. The embodiment of alarm control circuit 110 illustrated in FIG. 7 utilizes an opto-isolator 108 in conjunction with comparator 109. Comparator 109 can be any comparator known to those in the art, such as a 339 Quad Comparator, which utilizes four (4) differential comparators on a single chip, thus providing the capacity to monitor level in multiple tanks.

In high-level monitoring mode, one input to comparator 109 is formed by a reference voltage established by trimpot potentiometer 106, which is connected to supply voltage at terminal 1 of alarm control circuit 110. Input power to alarm control circuit 110 can be via a bridge rectifier to safeguard against changes in polarity. A second input to comparator 109 is provided by sender unit 145 (not shown), which is connected to alarm control circuit 110 terminal 3. Current limited power is available to sender unit 145 via pull-up resistor R. As level within tank 140 (not shown) rises, the voltage at sending unit 145 is reduced. When the level corresponding to the voltage set by trimpot 106 is reached, comparator 109 triggers and the output of the comparator drives opto-isolator 108, which in turn energizes relay 107 to provide output 115 at terminal 5 until power is disconnected at terminal 1. Additional trimpots 106 will be required for each additional set point desired, such as high-low and high-high set points.

In low-level monitoring mode, the circuit operates in the same manner as the high-level mode except that the input voltage is supplied via terminal 4. Output and reference voltage of low-level monitoring mode are not shown to maintain clarity of the drawing but mirror that of the high-level mode.

Figure 8:
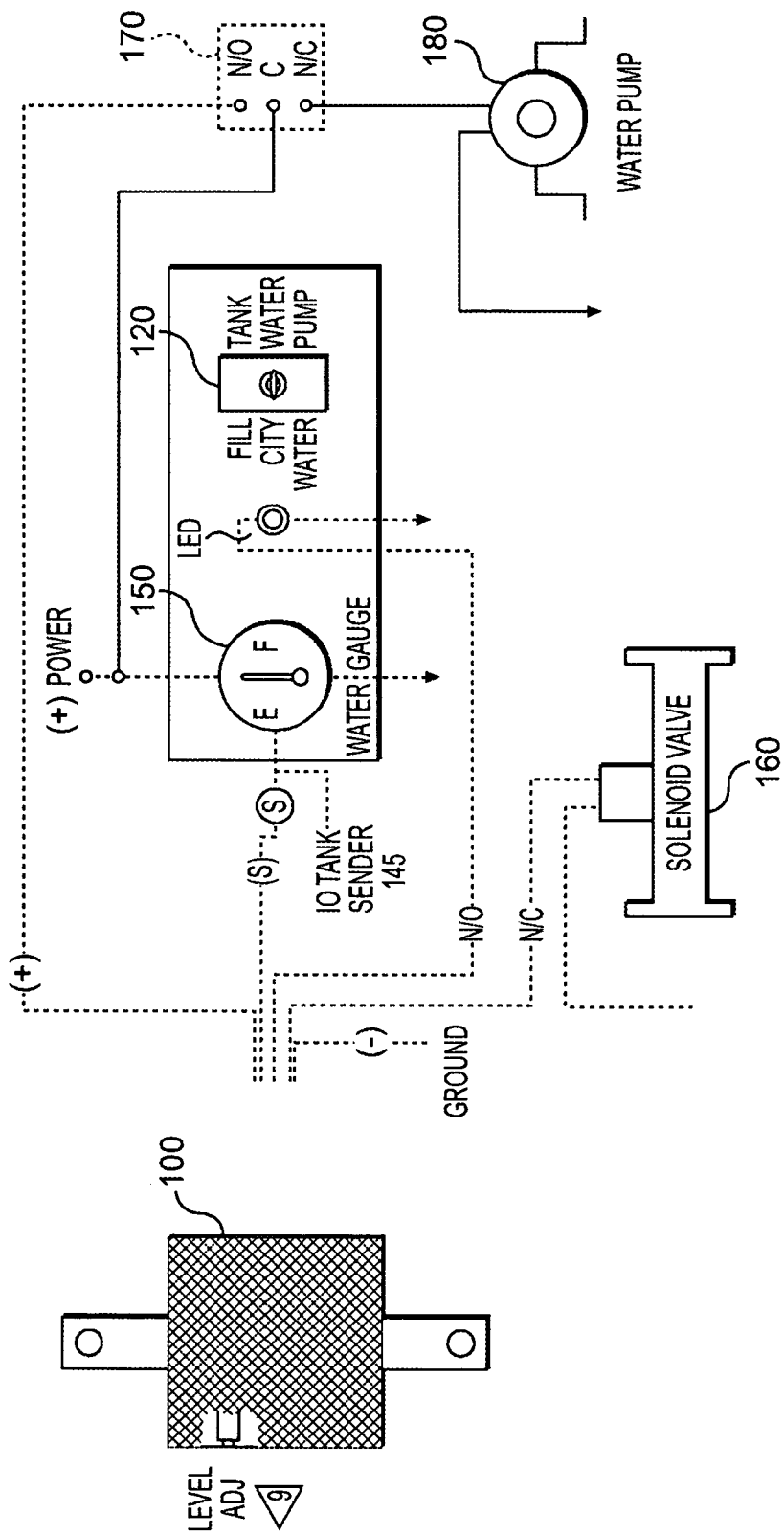
FIG. 8 illustrates the components of an embodiment of a high/low level alarm controller configured to monitor water fill.

The present invention has application to fuel tanks but is not limited to cooperation with fuel tanks and can also be used to signal and control level in any liquid storage tank, such fresh or potable water tanks, black water tanks, grey water tanks, chemical tanks, etc. For example, FIG. 8 illustrates another embodiment of the present invention featuring the high/low level alarm controller configured to monitor operations of a fresh water tank. Water tanks are typically constructed of thin roto-molded plastic material. The vent on the water tank is sized so that it can adequately vent air but once liquid enters the vent area the liquid becomes a back-pressure source and clogs the vent while the water is trying to escape. This causes the municipal water pressure to be backed-up into this tank, and since the tanks are typically only rated at about 10 lbs, it doesn't take much pressure to damage the tank. So if a municipal water source of about 40 or 50 lbs is employed to fill the tank, the tank can split at the seams. And this is what happens at the marine level. In a less extreme case the tank becomes distorted and actually stays that way. Thus, the high/low level alarm controller can be configured to monitor operations of a fresh water tank to prevent this damage from occuring.

Referring to FIG. 8, the high/low level alarm controller 100 is outfitted with a three position mode selector switch 120: 1) first position activates filling of fresh water tank; (2) the second position is a neutral or middle position, which is the position that gives the boat municipal water. When stationed at dock, the water system is not drawing water from the on-board fresh water tank, the system uses pressurized water that comes that is available from the municipality. When ready to disconnect from the municipal water supply, position three is selected (3), which then powers an internal water pump that pressurizes the boat from its own water pump system. Thus, the controller has three functions, which are selectable via selector switch 120.

Solenoid valve 160 is a normally-closed electrically operated water valve. The coil of valve 160 is attached to relay 130 (internal to controller 100). When ready to fill the water tank, selector switch 120 is positioned to the 'Fill' mode, which energizes relay 130 and opens up valve 160, allowing water to flow. Controller 100 is armed and waiting to shut off valve 160 when the water in the tank gets to the high level point by de-energizing relay 130. LED illuminates when process is complete. For controller 100, 'Fill' mode is equivalent to "high-level" monitoring mode described in the preceding embodiments. The water tank has sending unit 145 installed. Sending unit 145 activates level gauge 150, which can be analog or digital.

Positioning selector switch 120 to the center position ("City") opens a second valve (not shown) that is in parallel with fill valve 160. And this second valve allows municipal water to go directly into the vessel, bypassing the water tank. Thus, the internal system is supplied with municipal water until ready to disconnect from the dock. Fill valve 160 remains de-energized and closed.

When ready to leave the dock, selector switch 120 is toggled to the third position, which drives relay 170 to provide electrical power to water pump 180 to provide internal pressurized water. Pump 180 receives a signal from a pressure switch (not shown) such that when the pressure in the system drops, as might occur when a faucet handle is turned. The pressure switch detects the drop in pressure and then signals relay 170 to provide power to pump 180 to build the pressure back up; pump 180 is taking its water from the internal tank that was filled during the 'Fill' mode. The system will remain in this position as long as the boat is at sea. Gauge 150 can be used to continuously monitor the level in the water tank.

The water tank has a second (redundant) level switch (not shown) that will disable fill valve 160 if sending unit 145 fails. The second level switch is within a short stem hanging from the top of the tank and uses just one switch and float to activate the high level signal, i.e., single-point level detection (as opposed to continuous level monitoring as is provided by sending unit 145).

Numerous characteristics and advantages have been set forth in the foregoing description, together with details of structure and function. The novel features are pointed out in the appended claims. This disclosure, however, is illustrative only and changes may be made in detail within the principle of the invention to the full extent indicated by the broad general meaning of the terms in which the appended claims are expressed. For instance, the present invention is ideally suitable monitoring fuel capacity and filling on a ship, but it can also be applicable to general liquid storage that has level monitoring, such as that which may occur in Recreational Vehicles (RV), chemical plants, etc.

What is claimed is:

1. A high/low level alarm controller, comprising:
   a selector switch;
   a relay; and
   an alarm control circuit,
   wherein said selector switch is connected to said relay and said alarm control circuit, said alarm control circuit being configured to provide an electrical output responsive to monitoring of a fuel level, wherein said selector switch and said relay form an isolation control unit, and said isolation control unit is configured to isolate instrumentation and prevent unwanted voltages during fueling.

2. The alarm controller of claim 1, wherein said isolation control unit is connected to a power supply, gauge, alarm control circuit and level sending unit, and said isolation control unit is configured to isolate at least one of the level sending unit and the gauge from other instrumentation of the marine craft.

3. The alarm controller of claim 1, wherein said alarm controller is configured to output an alarm in response to a fuel level reaching at least one set point.

4. The alarm controller of claim 2, wherein the power supply is at least one of a steady source and a switched source.

5. The alarm controller of claim 3, wherein the at least one set point is at least one of a high-level set point and a low-level set point.

6. An apparatus for a marine craft, comprising:
   an alarm control circuit;
   a level sending unit;
   a power supply;
   a gauge coupled to said power supply; and
   an isolation control unit;
   wherein the isolation control unit is connected to the power supply, gauge, alarm control circuit and level sending unit; and said isolation control unit is configured to isolate at least one of the level sending unit and the gauge.

7. The apparatus of claim 6, wherein the isolation control unit further comprises a selector switch and a relay.

8. The apparatus of claim 6, wherein the gauge is at least one of analog or digital.

9. The apparatus of claim 6, wherein the level sending unit is installed within a fuel tank of the marine craft.

10. The apparatus of claim 6, wherein the level sending unit is powered independently of the other instrumentation of the marine craft during fueling.

11. The apparatus of claim 10, wherein the alarm control circuit provides the voltage to power the level sending unit.

* * * * *